United States Patent [19]

Buelens et al.

[11] 4,403,845
[45] Sep. 13, 1983

[54] CASSETTE FOR HOLDING AND DISPENSING A ROLL OF WEB MATERIAL

[75] Inventors: Edward Buelens, Kontich; Carolus C. Goossens, Berchem, both of Belgium

[73] Assignee: Agfa-Gevaert N.V., Mortsel, Belgium

[21] Appl. No.: 328,626

[22] Filed: Dec. 8, 1981

[30] Foreign Application Priority Data

Dec. 9, 1980 [GB] United Kingdom ................ 8039456

[51] Int. Cl.³ ............................................. G03B 17/26
[52] U.S. Cl. .................................. 354/275; 242/71.1; 242/75.4
[58] Field of Search ............. 354/275; 242/71.1, 75.4, 242/197, 55.53; 206/316, 387; 352/72, 78 R

[56] References Cited

U.S. PATENT DOCUMENTS 3,613,876 10/1971 Kohler et al. ................ 242/71.1 X
3,784,001 1/1974 Bushnell et al. ............. 242/71.1 X Primary Examiner—John Gonzales
Attorney, Agent, or Firm—William J. Daniel

[57] ABSTRACT

A cassette for holding and dispensing a roll of web material that is provided with locking means for preventing rotation of the roll prior to initial withdrawal of material from the roll, the locking means being formed by a generally rigid locking member with one end portion frictionally engaged within the core of the roll, and the other end portion non-rotationally connected with a cassette end wall, and a weakened zone interconnecting those end portions, and adapted to rupture upon rotation of the core incidental to the initial withdrawal of material from the roll.

10 Claims, 6 Drawing Figures

CASSETTE FOR HOLDING AND DISPENSING A ROLL OF WEB MATERIAL

The present invention relates to a cassette for holding and dispensing a roll of web material.

The invention is particularly suitable for embodiment in a cassette for holding and dispensing a roll of unexposed light-sensitive material for use in phototypesetting apparatus.

Cassettes for holding and dispensing rolls of light-sensitive material wound onto a tubelike core are known which are in the form of a box or container comprising a tubular shell and two plastic molded parallel end walls having central hub portions for rotatably supporting said core within the box. The shell has a peripheral exit slot extending along its full length through which the material can be light-tightly withdrawn from a the roll. The cassettes are loaded by the manufacturer, the leading end of the roll extending through the exit slot, so that they are ready for use by the customer.

Conventional cassettes do not prevent unwinding of the roll of web material under the influence of vibrations, occurring particularly during the transport of the cassettes. This unwinding is caused by the stiffness of the web material, in particular film comprising a polyester support. Under vibration, the diameter of the roll increases until the outer roll winding comes into contact with the inner face of the cassette shell. As a result, the film will rub against the inside of the shell as the film is drawn from the cassette. When the shell has a four-sided form, it has been found that the unwinding may even go so far that the roll of web material takes a square rather than a circular form. In these circumstances the rubbing contact is greater.

If the material is wound with the light-sensitive layer facing towards the centre of the roll, this rubbing phenomenon has little or no adverse effects because it is the rearside of the material which comes into rubbing contact with the shell. This situation is notably the case for photographic paper which, moreover has only a small unrolling tendency. Unfortunately, when conventional cassettes are loaded with photographic film, in particular film for use in phototypesetting apparatus, the light-sensitive layer of the film is liable to suffer damage because the film is usually wound with that layer facing outwardly.

There are known microfilm cassettes provided with means for locking the filmroll against undesired unwinding prior to the first use of the cassette. The locking means consists of a locking member co-operating with the core and with a wall of the cassette and having a weakened section that may be ruptured by the torsion caused by the rotation of the core when the user starts drawing the film web from the cassette. Such known locking member requires a special design for the cassette and the filmspool to ensure its proper engagement with these components.

It is the aim of the present invention to provide locking means that may be readily used in existing cassettes of the type described hereinbefore, without the necessity for a redesign of the cassettes. The invention aims to provide also locking means that may be used in existing cassettes while requiring only a partial redesign of such cassettes. The invention is particularly intended for use in cassettes for webs having a width larger than 7.5 cm.

According to the present invention, a cassette for holding and dispensing a roll of web material wound onto a tubelike core, comprises a box or container formed of a tubular shell and two end walls having central hub portions for rotatably supporting the core within the box, the shell having a peripheral exit slot through which the material can be withdrawn from the roll, and a rigid locking member for preventing rotation of the core prior to the first use of the cassette, such member having two end portions connected by a weakened zone which can be ruptured by rotation of the core incidental to the initial drawing out of the web material from the cassette, one of said end portions of said locking member being located in and frictionally engaged by the core of the roll, and the other end portion being in engagement with the hub portion of one end wall of said box so as thereby to prevent rotation of the core.

The term "end portions" where used herein in relation to the locking member denotes the portions thereof which are on opposite sides of its weakened zone.

It is an advantage for a cassette according to the invention that its core does not have to be designed with special means for holding the locking member. Thus conventional plastic and paper board cores need not be modified in order to be useable in the cassette. The engagement of the locking member with the hub portion of one end wall of the box can be of tongue and slot form, one end portion of the locking member forming a tongue which projects through a slot in the hub portion. The slot can be cut in the end wall of the hub (which may be the hub of an otherwise conventional cassette end cap) after moulding or otherwise forming such cap. Alternatively the end cap can be moulded with such slot. The light-tightness of a cassette of the described kind is not affected by the presence of such a slot, as will be explained later in this specification.

The weakened zone of the locking member may be formed by a suitable material that is more easily ruptured on application of torsional forces to the locking member than the material of the end portions of such member. But preferably this weakened zone is constituted by a cross-sectionally reduced section of the locking member, the latter being a one-piece member of the same material throughout. A suitable material for the locking member is aluminium, or an aluminium alloy that may advantageously be shaped to the required form by stamping from a sheet of suchlike material.

Advantageous optional features of a cassette in accordance with the invention are as follows. The frictional clamping of one end portion of said locking member is such that the other end portion of the locking member is displaceable in a direction that is radial with respect to the axis of the core. In this way, the insertion of the other end portion of the locking member in a slot of the hub portion of one end wall during assembly is facilitated in the case of slight misalignment of the locking member in the core.

The other end portion is a flat portion having two opposite side edge portions that run parallel to each other and parallel to the longitudinal axis of the member, and having a curved end tongue portion which protrudes through a slot in the hub portion of the cassette, the location of slot wall falling within the section defined by the parallel side edges. The tongue and portion facilitates its engagement with the slot upon assembling the cassette, and the parallel side walls allow for slight variations in the axial position of the locking member in the slot.

The invention is particularly suited for use in a cassette as claimed in GB P 1,546,068 relating to a light-tight cassette, and in EU Patent Publication 16,488 which also relates to a light-tight cassette, both being assigned to the same assignee as the present application. However, it will be understood that the invention is not limited to these particular cassettes, as will become apparent from the description hereinafter.

The invention will now be described by way of one example with reference to the accompanying drawings wherein.

Figure 1:
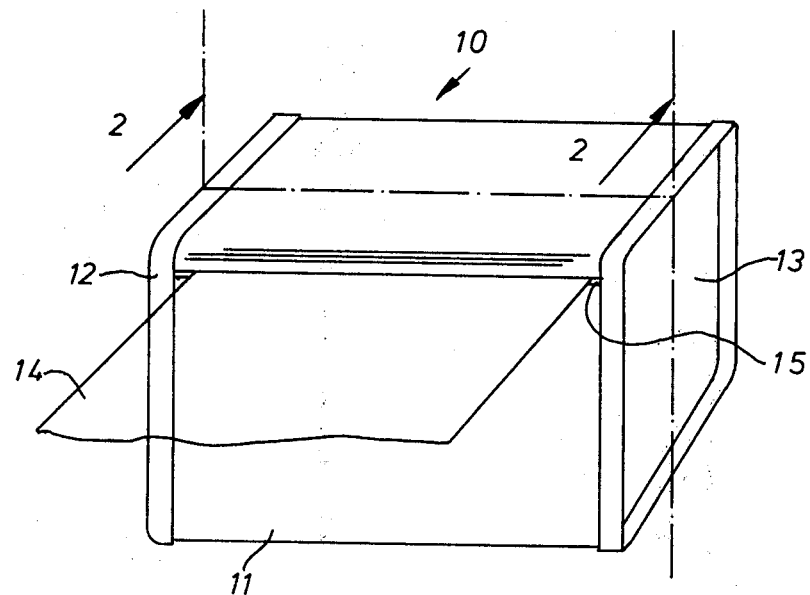
FIG. 1 is a perspective view of one embodiment of a cassette according to the invention.

Referring to FIG. 1, a rectanguloid cassette 10 for holding a roll of light-sensitive photographic material comprises a shell portion 11 and two end caps 12 and 13. A web 14 of photographic material may be drawn from the cassette through a light-tight exit slot 15 that extends between the end caps over the full length of the shell portion and may be situated close to a corner portion of the shell. The photographic material has been illustrated as being transparent in the figure. The shell portion of the cassette may be manufactured from plastic or paperboard whereas the end caps may preferably be made from plastic by injection-molding or by thermo-vacuum forming.

Figure 2:
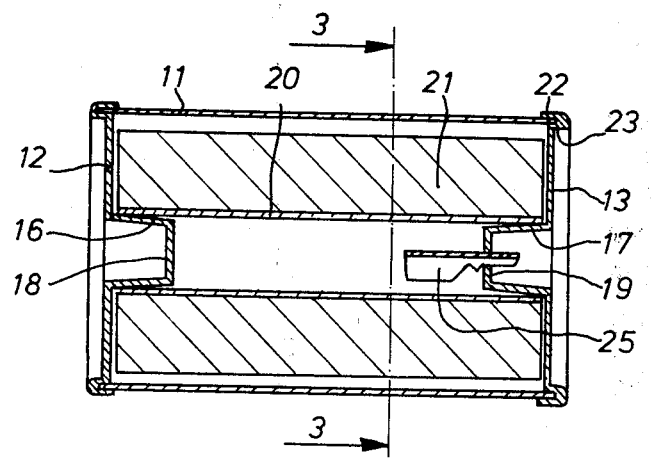
FIG. 2 is a vertical longitudinal section taken along the plane indicated by the line 2—2 of FIG. 1.

FIG. 2 illustrates a vertical longitudinal cross-section of the cassette along line 2—2 of FIG. 1. The end caps have central hub portions 16, 17 formed by central portions upset from the wall of the caps terminating in circular end faces 18 and 19. The hub portions have a slight conical form and they rotatably support a hollow core 20 onto which a roll 21 of the light-sensitive web 14 is wound. The core is a tubular body that is suitably made from paperboard or plastic.

The ends caps 12 and 13 may have inner and outer peripheral flanges as at 22 and 23, defining a peripheral groove for receiving an end of the shell 11. The fixing of the end caps to the shell may be by glueing, by taping, or even by stitching as disclosed in EU Publication 16,488 mentioned hereinbefore. The end caps may further be provided with radial ribs for increased rigidity and with corner guide potions with sloping flanks for facilitating the assembly of the shell and the end caps, all as known in the art.

The locking member for locking the core 20 against undesired rotation in the cassette is an elongated member 25 that extends from the core 20 into a slot in the circular wall 19 of the hub portion 17. The form of the locking member 25 is difficult to recognize in FIG. 2, since the member has been cut half away by the section according to the plane 2—2 of FIG. 1 and, moreover is assumed to be situated in a plane that is at an angle of 45° with respect to the faces of the shell 11. The form and the operation of the locking member are better understood by the illustration of FIG. 4 which is a partially enlarged sectional view on line 4—4 of FIG. 3 where also the slot 26 in the hub portion 17 is clearly visible.

Figure 4:
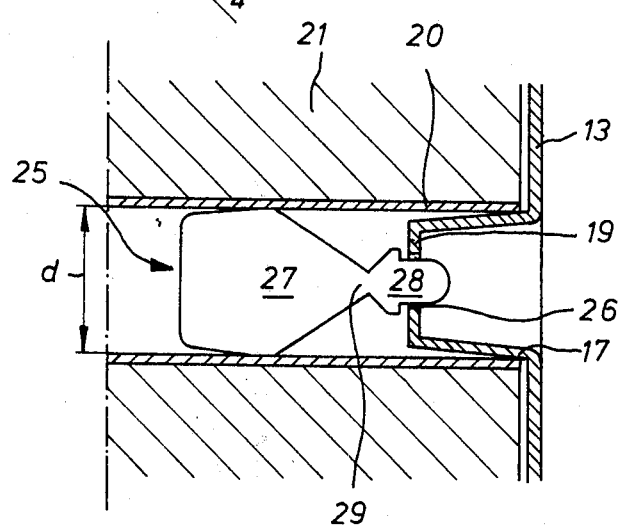
FIG. 4 is an enlarged detail view of a fragmentary section along line 4—4 of FIG. 3, of the locked end portion of the core of the cassette.

Referring to FIG. 4, the locking member 25 is a flat piece of generally rigid sheet material having a first end portion 27 that is frictionally engaged by the core 20, and a second tongue-shaped end portion 28 that engages in the slot 26 in the hub. Those end portions are interconnected by a zone 29 of reduced width. Details of the locking member are as follows, with reference to FIGS. 5 and 6. The end portion 27 has a greatest width a at a position 30, a slightly less width b at a position 31, and a still less width c at the rear edge 32, whereby said end portion has in fact slightly convexly curved or flared side edges. The width a slightly exceeds the inner diameter d of the core 20, and the width b is slightly smaller than said diameter d. The purpose of this difference in widths is as follows. The width a is such as to ensure the frictional clamping of the member 25 by the core 20 to such an extent that relative rotation of member in the core under the influence of forces applied to the end portion 28 is precluded. The clamping action is, however, not so tight as to prevent the locking member from undergoing bodily axially displaced within the core, as is required when the locking member is inserted into its illustrated position. The insertion of the member may be carried out in a simple way by means of a slotted cylindrical tool, not illustrated, wherein the tongue-like end portion 28 of the member is temporarily clamped, and by means of which the member 25 is slid into the core 20 preparatory to the assembly of the cassette. At this stage, the roll 21 is preferably already wound on the core. A collar or the like on the tool may determine the depth of insertion of the tool in the core so that a reproducible position of the member 25 in the axial direction of the core is attained.

A further consideration in connection with the dimension a is that the clamping force should not cause any significant deformation of the tubular core. Such deformation might cause pressure-sensitizing of light-sensitive material on the core, and it might also impede the smooth rotation of the core on the cassette hub portions. The mutual inclination of the lateral side edges 33 and 34 of the locking member between positions 31 and 32 facilitate introduction of the locking member into the core. The inclination of these side edges between the positions 31 and 30 is less than between 31 and 32, and suffices to localize the gripping zone between the positions 31 and 30. Thus, although the sided edges between 31 and 30 may be in contact with the inner wall of the core, the point of maximum pressure is located at the position 30, so that the member is capable of undergoing a pivotal or tilting movement about an axis that coincides approximately with the dimension a, which results in a displacement of the end portion 28 of the member in the sense indicated by arrow 35 illustrated in FIG. 6. This possibility for pivotal movement facilitates engagement of the end portion 28 in the slot 26 of the end cap 13, during assembly. Any possible small misalignment of the member in a direction parallel with the longer side of the slot is self-correcting because the rounded end edge 36 has a limited centering effect on the member during assembly.

The length 1 of the parallel side walls 42, 43 of the end portion 28 of the member 25 is sufficient to allow slight tolerances in the relative axial position of the end portion 28 with the slot 26.

Purpose of the shoulder portions 37 and 38 is to prevent the end portion 28 from falling out of the cassette through the slot 26 following rupture at the zone 29, and thereby possibly damaging the mechanism of the exposure apparatus, such as a phototypesetter, wherein the cassette is used.

The strength of the weakened zone 29 must be such that the locking member is not ruptured by forces exerted by the roll 21 during transport, handling, etc., of the cassette, but yet may be readily separated by the twisting force imposed by rotation of the roll incidental to initial withdrawal of web from the cassette by the operator. The force that is required for the unlocking of the roll will be greater than the frictional resistance to rotation of the roll on the hub portions 16 and 17, but should preferably be smaller than the pulling force which would be necessary for causing a constricting of the roll windings.

A further condition for the satisfactory operation of the locking system according to the invention, is that the friction of the roll 21 on the core 20 is sufficient to insure that the roll and core rotate as a unit. If the winding characteristics of the roll on the core are such that sufficient frictional engagement with the core surface by the innermost convolution it is not possible, then the trailing end of the roll should be attached to the core for instance by the use of adhesive or by spotwelding of a thermoplastic layer on the core.

Figure 3:
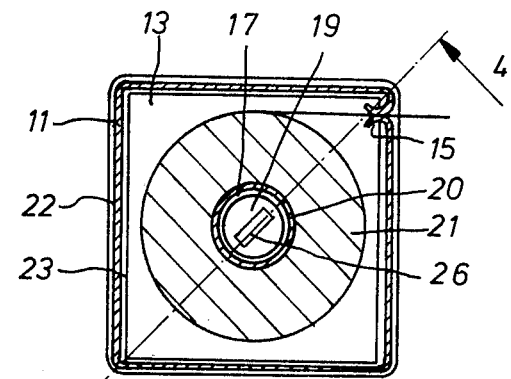
FIG. 3 is a vertical transverse cross-section along line 3—3 of FIG. 2, the locking member being removed.

The reason for orienting the slot 26 at an angle of 45°, as illustrated in FIG. 3, is to avoid that the end portion 28 would ever exert an excessive pressure on an end of the slot opening 26. Such a situation might happen if the member 25 had been misaligned in the core whereby the end portion 28, considered according to the position of FIG. 4, would be located lower than the illustrated position, so that it could strongly bear on an end of the slot in the case of a vertically oriented slot. The disposition of the slot at 45° avoids a vertical orientation of the slot in all stacking positions wherein two side walls of the shell are horizontal and the two other side walls are vertical.

The following data relate to an example of a cassette with a locking member according to the invention.

Figure 5:
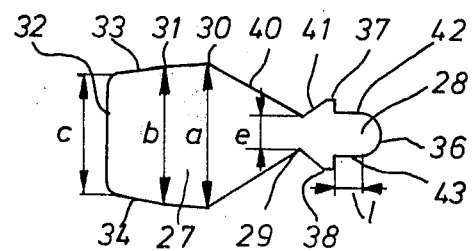
FIG. 5 is a plan view of one embodiment of a locking member.
Figure 6:
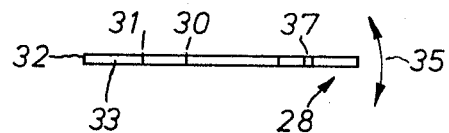
FIG. 6 is a side view of this embodiment.

| | | |
|---|---|---|
| Core 20: | paperboard with a wall thickness of | 2 mm |
| | inner diameter | 28.6 mm |
| | length | 75 mm |
| Roll 21: | light-sensitive photographic film for phototypesetting, | |
| | light-sensitive layer wound at outerside of roll | |
| | length of the roll | 30.5 m |
| | width of the roll | 77 mm |
| Locking member 25: shape as illustrated in FIGS. 5 and 6. | | |
| Made by stamping from a sheet of aluminum with a thickness of 1.2 mm. | | |
| | Dimension a: | 29.8 ± 0.1 mm |
| | Dimension b: | 29.4 ± 0.1 mm |
| | Dimension c: | 5.0 ± 0.1 mm |
| | Slot 26: | length: 13.0 ± 0.2 mm |
| | | width: 2.0 + 0.0−0.2 mm |

The normal force for drawing the film from the cassette varied between 400 g and 675 g. The initial drawing force for shearing the locking member amounted to approximately 3000 g.

The shearing of the locking member starts with a torsional deformation of the weakened neck portion 29 over approximately 90 degrees.

Upon further rotation of the core, the neck 29 is broken off. This shearing of the locking member occurs very smoothly. The portion 28 may remain in the slot 26, but usually will fall inwardly out of that slot to rest on the inner wall of the core.

It has been found that the shaping of the locking member with edge portions tapering towards the neck portion 29 (see FIG. 5) facilitates dislodgment of the portion 28 from the slot 26 after the rupture of the neck portion. It has been found that a locking member wherein the angle between its edges terminating at the neck portion 29, and the corresponding wall section of the core, was much greater than that illustrated in FIG. 4, for instance a locking member wherein the neck portion was formed by two opposite radial indentations or slots in a rectangular plate thereby to reduce the cross-section of the member, did not always operate satisfactorily, because after rupture of the neck portion, the portion 28 became jammed by the shoulders of the end portion 27 before the end portion 28 had dropped completely out of the slot 26.

The light-tightness of the cassette is not impaired by the slot 26. Light that enters through the opening between the periphery of the slot 26 and the end portion 28 of the locking member 25 is distributed within the core and is sufficiently dissipated on its passage through the narrow annular space between the hub portions 16 and 17 and the core, before it reaches the ends of the roll of light-sensitive material, to be incapable of fogging the light sensitive material.

The invention is not limited to the described embodiment. The shell portion of the cassette may have other forms than the rectanguloid one illustrated. For instance, the shell may have a circular cross section or a combination of a half circular with a half square form.

One end wall may be integrally formed with the shell, so that the cassette comprises one removable end cap only. The locking member may be made of a material other than aluminium, e.g. a metal alloy, plastic or a fiber-bonded material, and may take a form that differs from the illustrations in FIGS. 4 and 5. The locking member may be made by moulding rather than by stamping as described.

The non-rotational co-operation of the locking member with a wall portion of the cassette may also occur otherwise than through a tongue and slot engagement. For instance, the wall 19 of the hub member 17 may be provided, on the side facing into the core, with two parallel ribs between which may fit an end portion of the locking member, such as the portion 28 of the member 25. The end edge of such end portion is in such case preferably straight, unlike the rounded edge 36 illustrated in FIG. 5. This configuration requires, it should be noted, a redesign of the moulds or tools for producing the end cap. The tubelike core, on the contrary, does not require any modification. A redesign for the end caps is not required in the cassette according to the embodiment disclosed hereinbefore, since the slots 26 may be cut in the caps after formation thereof.

What we claim is:

1. A cassette for holding and dispensing a roll of web material wound onto a tubular core, said cassette comprising a container having a tubular shell and two end walls with central hub portions, a tubular core carrying a roll of web material wound thereon and rotatably supported by said hub portions, the shell having a peripheral exit slot through which the material can be drawn from said roll, and a generally rigid locking member for preventing rotation of the core prior to the first use of the cassette, such member including two end portions connected by a weakened intermediate portion which can be ruptured by rotation of the core incidental to initial withdrawal of the web material from the cassette, one of said end portions of said locking member extending into the interior of said core in frictional engagement with the inner surface thereof, and the other end portion being in non-rotative engagement with one of said hub portions to thereby prevent rotation of the core until said weakened portion is ruptured.

2. A cassette according to claim 1, wherein said one end portion of said locking member is rounded at at least one of its points of frictional engagement with that core so said other end portion can be displaced in at least one direction radially of the core.

3. A cassette according to claim 2, wherein said one end portion of said locking member is defined by two opposite outwardly convex edges, the maximum distance between said edges exceeding the interior diameter of the core to such an extent that the locking member is frictionally seated in said core and thereby held against rotational displacement about the axis of the core but can be tilted within its own plane.

4. A cassette according to claim 1, wherein said other end portion has two opposite side walls that run generally parallel to each other and to the longitudinal axis of the member, and terminate in a common curved end wall.

5. A cassette according to claim 4, wherein said other end portion of the locking member is in engagement with a slot in the corresponding hub portion along an axial locus within the length 1 of said side wall.

6. A cassette according to claim 5, wherein said other end portion is provided with retaining means which prevents that portion from passing outwardly through the slot and out of the cassette after rupture of the weakened portion.

7. A cassette according to claim 1, wherein said one and said other end portion of said locking member taper inwardly towards said weakened zone.

8. A cassette according to claim 1, wherein said locking member has been cut from a sheet of aluminum.

9. A cassette according to claim 1, wherein the inner end of the roll of web material is fixed to the core.

10. A cassette according to claim 1, which is of generally light-tight construction for holding and dispensing a roll of light-sensitive material.

* * * * *